Jan. 13, 1970　　　　　G. EHEIM　　　　　3,489,095
ELECTRIC MOTOR-PUMP-FILTER COMBINATION PARTICULARLY FOR
FISH TANK CIRCULATOR AND FILTER UNITS
Filed March 19, 1968　　　　　　　　　　　　　　3 Sheets-Sheet 1

Inventor

Gunther Eheim

Jan. 13, 1970  G. EHEIM  3,489,095
ELECTRIC MOTOR-PUMP-FILTER COMBINATION PARTICULARLY FOR
FISH TANK CIRCULATOR AND FILTER UNITS
Filed March 19, 1968  3 Sheets-Sheet 3

United States Patent Office 3,489,095
Patented Jan. 13, 1970

3,489,095
ELECTRIC MOTOR-PUMP-FILTER COMBINATION PARTICULARLY FOR FISH TANK CIRCULATOR AND FILTER UNITS
Gunther Eheim, 32 Plochinger Strasse, 7301 Deizisau, near Esslingen, Germany
Filed Mar. 19, 1968, Ser. No. 714,263
Int. Cl. F04d *13/02;* H02k *5/10;* E04h *3/20*
U.S. Cl. 103—87                             8 Claims

ABSTRACT OF THE DISCLOSURE

The pump compartment is separated both from the motor, as well as from the filter. The pump impeller is driven by a ring magnet, axially polarized and facing a similar, axially polarized ring magnet driven by the motor, across a non-magnetic separating wall. Attractive force of the magnets is counterbalanced by providing small openings at the high-pressure side of the pump to admit fluid between the impeller and the end wall of the pump housing, and further by so arranging the air gap between the two magnets that the lag of the driven magnets with respect to the driving magnet places the two magnets in a position where attractive force is small, thus avoiding the necessity of thrust bearings for the impeller and motor shafts. In order to additionally decrease the end loading on the motor shaft, the rotor is off-set axially with respect to the stator, when at rest, the rotor tending to assume a symmetrical position upon operation of the motor, thus providing a force counterbalancing the attractive force of the two magnets.

---

Figure 1:
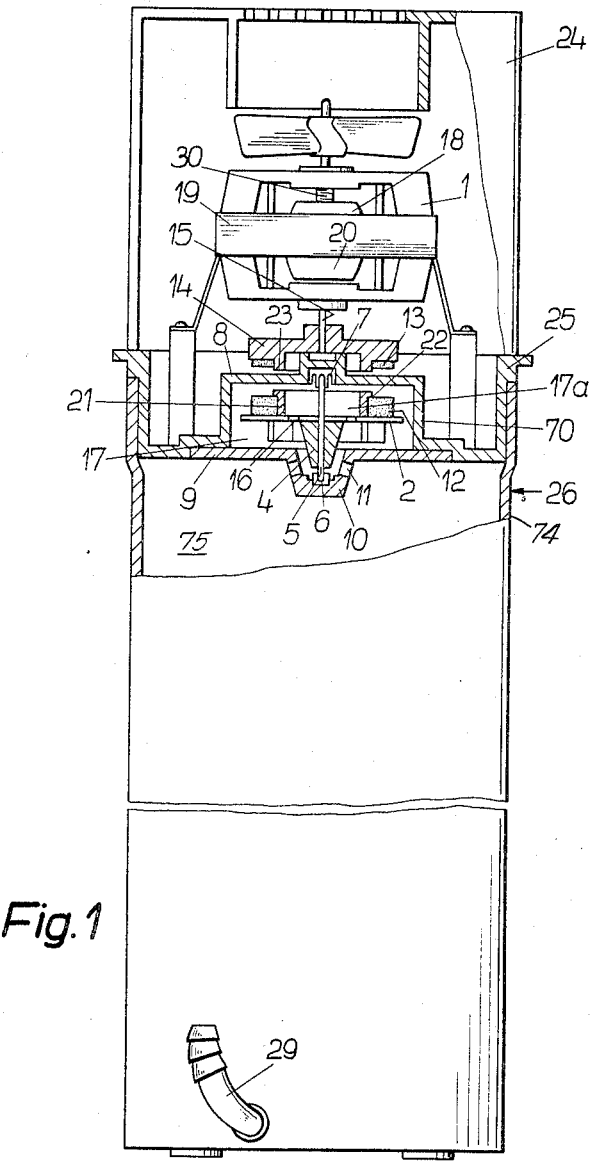

The present invention relates to electric motor-pump combinations and more particularly to such combinations for use as circulating and filter pumps for fish tanks, and in which the driven pump impeller is separated from the motor by a non-magnetic end wall of the pump housing, for example of plastic, and driven by a magnetic coupling.

Centrifugal pumps, using magnetic couplings between the driving motor shaft and a driven impeller are known, and also in combination with filter units for use as circulating and filter pumps for fish tanks. Such pumps, as previously constructed, usually have a cylindrical, radially polarized permanent magnet secured to the motor shaft. A coordinate, hollow cylindrical similar magnet, also radially polarized, cooperates with the driving magnet. The two magnets are separated by a small gap, formed by part of the housing. Pumps of this kind, though effective in use, require a substantial axial extent of the pumping chamber, due to the fact that the cylindrical magnet secured to the driving motor shaft must interfit with the driven hollow cylindrical magnet connected to the impeller. In one form of construction, a closed tubular extension extends into the pumping chamber to provide a sealed-off region for the cylindrical magnet connected to the motor; surrounding this tubular extension may be a similar, larger tube closing off the space in which the cylindrical, driven magnet rotates, and also forming bearing points for the impeller wheel. The entire assembly may be closed off by a cap. Most easily, the entire construction is made of extruded plastic. Due to the intricate shape, the plastic extrusion is difficult to form.

It is an object of the present invention to provide a water pump-motor combination, particularly for fish tank circulators which provides for coupling of an impeller to the motor without a seal, which is compact and is of small axial extent, can readily be assembled, and utilizes primarily plastic extrusion parts without complicated bearing constructions.

SUBJECT MATTER OF THE PRESENT INVENTION

Briefly, a pump-motor assembly is combined with a filter unit, such as a filter pot, and forms an end wall thereof. The construction can be made flat, thus avoiding intricate molded shapes. A pair of ring-magnets, axially polarized and coaxially located are provided; one magnet is connected to the motor shaft; it is separated from the other, driven magnet, which is connected to the impeller, by the end wall of the pump housing. To counteract the attractive force of the two opposed, axially polarized ring-type magnets, means are provided which supply an axially directed force counter the magnetic attraction of the opposed magnets, to relieve both the impeller and the motor shaft ends of thrust, and thus enable a simple construction with bearings molded of plastic material.

The construction utilizing opposed ring-type magnets, which are axially polarized, can easily be carried out by forming openings in the impeller, near the high-pressure side of the water flow, and directing water under pressure between the impeller and the end wall of the housing, adjacent the magnets, to provide an axial thrust counter the magnetic attraction. Additionally, the gap between the magnets can be so arranged that the lag of the driven magnet, with respect to the driving magnet is such that the poles of the driven magnet will be essentially halfway between the poles of the driving magnet, so that attractive force is minimized.

End thrust on the bearing of the motor is overcome by placing the rotor axially off-set with respect to the stator on the motor shaft, so that, upon energization of the motor, the rotor will tend to assume a symmetrical position with respect to the stator, thus again providing an axially directed force on the motor shaft which will counteract the attractive force of the magnets.

Figure 2:
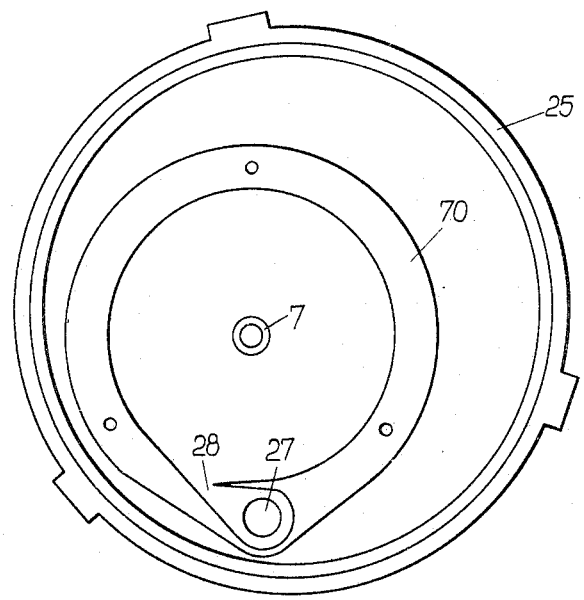
Figure 3A:
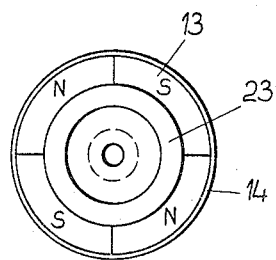
Figure 3B:
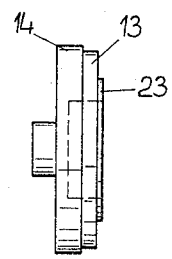
Figure 4A:
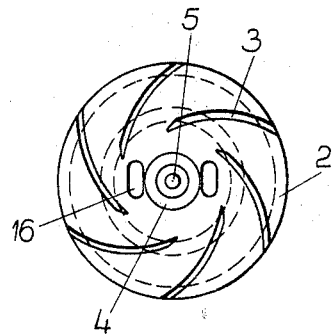
Figure 4B:
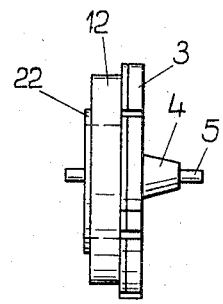

The structure, organization, and operation of the invention will now be described more specifically with reference to the accompanying drawings, wherein:

FIG. 1 is a vertical partly cross-sectional view of the pump and motor assembly, in combination with a filter;
FIG. 2 is a bottom view of the pumping chamber;
FIG. 3a is a top view of the motor shaft and the coupling portion thereof;
FIG. 3b is a side view of the part of FIG. 3a;
FIG. 4a is a top view of the impeller; and
FIG. 4b is a side view of the impeller.

An electric motor 1, operating at essentially constant speed, at a given load, drives a pumping impeller 2, being formed on one side with impeller vanes 3 (FIG. 4), and with a central hub 4. A shaft 5 passes through the hub and the impeller, and is freely rotatable in journals 6, 7. Impeller 2 is located within an essentially cylindrical pump chamber 70, defined at one side by a magnetically neutral material, such as plastic, and on the other side by means of a removable cover or lid 9. Cover 9 is formed with an integral counter hub piece 10, within which bearing 6 is formed. Additionally, openings 11 provide pressure openings for the outlet of the pump.

Impeller 2 is driven over a magnetic coupling formed of a pair of ring magnets 12, 13, coaxially arranged. Ring magnet 12 is secured to impeller 2. Ring magnet 13 is secured to a disk 14, fastened to shaft 15 of the motor 1. Ring magnets 12, 13 are axially magnetized, as seen in FIG. 3, for example with four poles, although any number is suitable, depending on size of the ring magnets.

Ring magnets 12, 13 automatically align, when the pump is assembled to the motor (FIG. 1) in such a manner that a North pole of one magnet is located opposite the South pole of another magnet. The aligned location of the magnets not only permits transmission of rotation, but also causes axially acting attractive forces, primarily effective on bearing 7, and also causing an axial loading component on the bearing of the motor shaft. These axial attractive forces are compensated, in order to provide a simple and inexpensive bearing construction for the pump-motor assembly.

Impeller 2 is formed with a pair of openings 16 located in the inner region of the impeller, that is close to central hub 4 (FIG. 1, FIG. 4a). Openings 16 interconnect the side of the impeller with the portion of the pumping chamber 17 between wall 8 of the pumping chamber and the impeller 2 itself, and indicated at 17a in FIG. 1. These openings thus permit application of fluid, under pumped pressure in the region between the impeller and the end wall of the pumping chamber, so that a pressure equalization will arise and the entire pressure within chamber 17 is no longer applied to the impeller wheel, but rather a lifting force counteracting the magnetic attractive force is provided. At the same time, the gap between the opposed surfaces of the ring magnets 12, 13 is so arranged, with respect to the power to be transmitted, that in operation, and due to the reactive force of the water on the impeller, the driven (impeller) magnet will lag with respect to the position of the driving magnet by a predetermined lag angle. This lag angle is measured from the position of coincidence of the pairs of magnets, at rest. Relative displacement by this lag angle decreases the attractive force between the magnets substantially.

The attractive force is, of course, greatest in the rest or ordinary position, when both magnets are opposed to each other, so that North and South tend to attract each other. Let it be assumed that the two ring magnets are manually rotated with respect to each other, to an angle of 90°. At that point, the positive attraction between magnets is converted into a repulsive force between equal poles of the axially polarized magnets. It can readily be seen that at intermediate positions, the attractive force decreases (from normal or rest position) until the polarity of the magnetic fields from each of the ring magnets becomes equal so as to result in a repulsive force. Of course, at a 90° lag position, no stable transmission of rotation can be effected. It is, however, possible to arrange the gap between the two magnets such that the lag angle, in operation, approaches the limiting position of 90°, on the one hand providing for a stable transmission of torque while on the other minimizing the attractive force between the two magnets to a very low value. Particularly in combination with openings 16 on impeller 2, axially arising forces on the shaft of impeller 2 can be compensated.

The structure is, of course, not limited to a four pole magnetized ring magnet; larger diameters of ring magnets, than usually used with small fish tank pumps, may require more poles in the ring magnets; very small pumps may require only two-pole systems.

Shaft 15 of motor 10 should, likewise, be relieved of axially arising forces. To this end, rotor 18 is off-set with respect to stator 19 in an axial direction, the amount of off-set, indicated at 20, being determined by the motor construction. In operation, rotor 18 tends to assume a symmetrical position within stator 19, and the resulting axial force is utilized in order to relieve the bearings of rotor shaft 15 of axial loading, due to the presence of the attractive force of the two ring magnets 12, 13. To permit axial movement of the rotor within the stator, shaft 15 is axially movable and biased into downward position by means of a spring 30.

Ring magnets 12, 13 preferably are formed of sintered permanent magnet material. Unfortunately, this material is very brittle. In order to provide for secure, and yet inexpensive holding of the magnets 12, 13 to the impeller and motor shaft, the holding elements are provided with an inner, cylindrical projection against which the ring-shaped magnets can bear, which projections are then flanged over. For example, impeller 2 has a cylindrical projection 21, extending beyond the ring magnet 12, and flanged over as seen at 22. The impeller, together with the cylindrical extension can be made as a single plastic molding. The construction provides for a safe and effective mounting of a ring magnet, the entire magnet bearing at its flat surface against the flat portion of the plastic impeller without subjecting the magnetic material to localized forces arising from any mounting arrangements. The cylindrical projection may, of course, also surround the magnet at the outside thereof, or a pair of projections can be formed, with the ring being dropped therebetween. Ring magnet 13 is secured to disk 14 in a similar manner, for example by an interior projection 23.

The pump and motor combination can readily be combined with a filter unit for direct connection to a fish tank. The motor is enclosed in a shell 24 and separately secured by stand-offs connected to the separating wall 25 and forming part of the pump chamber. Wall 25 at the same time forms the cover of a filter unit 26, having a water outlet 29. Cover 25, shell 24 and filter unit 26 can be clamped together in any well-known manner, not shown. Shaft 15 of the motor and shaft 5 of the impeller unit thus can readily be arranged coaxially, the bearing for the shafts, or one of them, being molded directly into lid 25. The pump chamber 70 is closed off from the filter space 75 by removable cover 9, so that upon disconnection of wall 25, from filter container wall 74, the entire pump-motor assembly can be removed from the filter, independently of the contents of the filter itself. Water is connected to the pump by an inlet 27 (FIG. 2) which supplies water for axial flow through the pump, the outlets being openings 11 formed in the hub-projection of cover 9. Throat 28 (FIG. 2) interconnects inlet 27 and the pump chamber 17.

The pump-motor combination of the present invention has been described in particular in connection with a pump for use as a circulating, and filter supply pump for small fish tanks. It is obvious that various modifications, within the scope of the invention, may be made and that the use of the pump is not restricted thereto, nor to sizes involving fractional horse power driving motors. For example, the pump can be used to great advantage in laboratories, or to supply any liquids having corrosive or chemically active effects, because the liquid is completely separated from the motor unit, and is exposed only to elements in the pump which can be made of material which is essentially immune to chemical attack, or in case of the magnets, can be coated or covered with such chemical-resistant materials.

I claim:

1. Electric motor-pump-filter combination for use as a fish tank circulation and filter pump, to form a combination pump-filter assembly, having an elongated housing (24, 26);

a removable interior wall (8, 9) within said housing separating said housing into a pumping section and a filter section and supporting said motor and pump separated from the space for filter material in said filter section;

an end wall (8) within said pumping section separating said pumping section from the motor (1) and defining a pumping chamber (70);

a shaft (5);

an impeller (3) mounted on said shaft, said shaft rotatably retaining said impeller in said housing;

a pair of coaxially, axially polarized magnets (12, 13), one (12) being mounted on the impeller (3) and the other (13) on the motor (1) and separated from each other by the wall (8) of said housing;

and means (16, 8) providing an axially directed force counter the magnetic attraction of said magnets (12, 13) acting on said shaft to relieve end thrust on said shaft due to magnetic attraction.

2. Motor-pump combination according to claim 1 wherein the means providing said axially directed force counter the magnetic attraction of said magnets (12, 13)

comprises openings (16) formed in said impeller directing pumped fluid between the impeller and said end wall to provide a lifting force counter the force of magnetic attraction.

3. Motor-pump combination according to claim 2 wherein said impeller is a spiral impeller and said openings are formed adjacent the hub thereof and interconnect the pressure side of the pump with the space between the impeller and said end wall, the sides of the openings being arranged to provide, at operating speed of the pump, a predetedmined counter force to the force of magnetic attraction.

4. Motor-pump combination according to claim 1 wherein said impeller is a spiral impeller and said housing has a hub portion formed at the side adjacent the spirals of said spiral impeller;

the hub portion of said housing being formed with openings therein and forming the suction side inlet for said pump.

5. Motor-pump combination according to claim 1 wherein said impeller is a spiral impeller having a central hub, and openings are formed in said impeller adjacent said hub to interconnect the pressure side of the pump with the space between the impeller and the end wall, the size of the openings being arranged to provide at said operating speed sufficient counter force to the force of magnetic attraction not neutralized by the lag of the impeller with respect to the motor.

6. Motor-pump combination according to claim 1 wherein the motor has a shaft and a rotor mounted on the shaft within the stator, said rotor being mounted with respect to said stator axially off-set whereby, upon operation, axial force is applied to said rotor shaft tending to center the rotor within the stator and the attractive force of said magnets will be counterbalanced.

7. Motor-pump combination according to claim 1 wherein said impeller has a flat surface facing said wall, one of said magnets being mounted on said flat surface concentric with said shaft;

and said impeller is formed with a tubular projection located concentric to said magnet and in contact with a side thereof; and an overlapping flange is formed on said projection, overlapping the magnet to secure said magnet against said impeller.

8. Motor-pump combination according to claim 1 including water inlet and outlet means formed in said pumping chamber, said inlet and outlet means being located in said housing to provide for axial flow of water through said pump.

References Cited

UNITED STATES PATENTS

| | | | |
|---|---|---|---|
| 3,238,878 | 3/1966 | Martin | 103—87 |
| 3,249,777 | 5/1966 | Congdon et al. | 310—104 |
| 3,321,081 | 5/1967 | Willinger | 210—169 |

ROBERT M. WALKER, Primary Examiner

U.S. Cl. X.R.

210—169; 310—104